United States Patent
Fujiwara et al.

(10) Patent No.: US 12,546,944 B2
(45) Date of Patent: Feb. 10, 2026

(54) OPTICAL MODULE

(71) Applicant: NTT, Inc., Tokyo (JP)

(72) Inventors: Yuji Fujiwara, Tokyo (JP); Nobutatsu Koshobu, Tokyo (JP); Satomi Katayose, Tokyo (JP); Kei Watanabe, Tokyo (JP); Ryoichi Kasahara, Tokyo (JP)

(73) Assignee: NTT, Inc., Tokyo (JP)

( * ) Notice: Subject to any disclaimer, the term of this patent is extended or adjusted under 35 U.S.C. 154(b) by 401 days.

(21) Appl. No.: 18/041,170

(22) PCT Filed: Aug. 21, 2020

(86) PCT No.: PCT/JP2020/031584
§ 371 (c)(1),
(2) Date: Feb. 9, 2023

(87) PCT Pub. No.: WO2022/038763
PCT Pub. Date: Feb. 24, 2022

(65) Prior Publication Data
US 2023/0358965 A1    Nov. 9, 2023

(51) Int. Cl.
*G02B 6/30* (2006.01)

(52) U.S. Cl.
CPC ..................... *G02B 6/30* (2013.01)

(58) Field of Classification Search
CPC ...... G02B 6/125; G02B 6/29325; G02B 6/30; G02B 6/122; G02B 6/262; G02B 6/2821; G02B 2006/12097
See application file for complete search history.

(56) References Cited

U.S. PATENT DOCUMENTS

2018/0008123 A1*  1/2018  Iwaisako .................. A61B 1/04

FOREIGN PATENT DOCUMENTS

| JP | 2004334003 A | 11/2004 |
| JP | 2014048628 A | 3/2014 |
| JP | 2018194802 A | 12/2018 |
| WO | 2016157301 A1 | 10/2016 |

* cited by examiner

*Primary Examiner* — Michael P Mooney
(74) *Attorney, Agent, or Firm* — Slater Matsil, LLP (57) ABSTRACT

An optical module includes two components that are optically connected, and includes a glass layer disposed in a region including an optical connection portion between the two components, at least one component includes a thin tube through which outside air is introduced, and an end face of the thin tube is in contact with the glass layer.

17 Claims, 5 Drawing Sheets

OPTICAL MODULE

CROSS-REFERENCE TO RELATED APPLICATIONS

This application is a national phase entry of PCT Application No.PCT/JP2020/031584, filed on Aug. 21, 2020, which Applications is hereby incorporated herein by reference.

TECHNICAL FIELD

The present invention relates to an optical module in which a plurality of components are optically connected.

BACKGROUND

Planar lightwave circuits (PLCs) have been used in optical communication/optical signal processing systems in the related art. PLCs are used in current communication networks and splitters for branching light, and optical switches for switching a path of an optical signal, and lasers ofr modulators as light sources are realized by PLCs in a broad sense.

PLCs are composed of quartz-based materials, silicon-based materials, semiconductor-based materials, and the like. PLCs are not usually used as a single unit and are used in the form of optical modules in which the PLCs and optical fibers are connected.

When PLCs are aligned with optical fibers and bonded and fixed, fiber blocks made of glass or the like are used for widening bonding cross-sectional areas and increasing mechanical strength of the bonded portion. For example, V-groove glass substrates (V-groove fiber blocks), micro-capillaries, ferrules, and the like may be provided. Optical fibers are fixed to these fiber blocks and the fiber blocks are bonded to the PLCs.

The fiber blocks are bonded to the PLCs by filling a connection gap with an UV curable resin adhesive and then performing alignment using a fine adjustment aligning device so that a photocoupling rate is maximized and radiating UV light to cure the UV curable resin adhesive, as shown in Patent Document 1.

Since the UV curable resin adhesive cures in about several minutes by irradiation with UV light, a curing time is much shorter than that of a room temperature curable adhesive or a two-component adhesive which cures by leaving it for several hours. Therefore, optical connection with good production throughput can be achieved by using the UV curable resin adhesive and the fiber block.

In recent years, since PLC devices have a small number of aligning steps and are resistant to vibration, they have also come to be expected to be used as image/sensor devices, and as the applications of PLCs have expanded, the light input to PLCs is also expanded from a communication wavelength band to a visible light band having a shorter wavelength. Therefore, it is necessary to take measures for propagating visible light not only to components constituting an optical module such as a PLC and an optical fiber, but also to an optical connection portion connecting them.

It is known that resin adhesives in the related art may absorb high energy light such as ultraviolet light and deteriorate. A connection method is adopted in which only a part through which light does not pass is fixed by a resin adhesive in an adhesion part between the PLC and the optical fiber, and a part through which light passes is set to be a gap (air gap) to prevent an increase in connection loss due to the deterioration of the resin.

However, this connection method has a problem that a dust collection phenomenon occurs in a gap portion through which light passes, resulting in an increase in connection loss.

Furthermore, PTL 2 discloses a method of filling a portion of the adhesive portion through which light passes with quartz-based glass. For example, one simple method is utilizing polysilazane as a glass precursor. Polysilazane is a polymer material having [(R1) (R2) Si—N(R3)] as a basic unit. Here, R1 represents hydrogen, R2 represents an alkyl group, and R3 represents a vinyl group.

The polysilazane is converted into $SiO_2$ glass by reacting with water. Since $SiO_2$ glass barely softens even in a high temperature environment in addition to having low photoreactivity and little deterioration due to input/output light of an optical connection portion, as compared to resin-based materials typified by a UV curable resin, it can be expected to prevent the misalignment of the optical connection portion.

CITATION LIST

Patent Literature

[PTL 1] Japanese Patent Application Publication No. 2014-048628
[PTL 2] Japanese Patent Application Publication No. 2018-194802

SUMMARY

Technical Problem

However, polysilazane has a very large curing shrinkage rate, air gaps and voids are generated by the curing shrinkage, and it is difficult to uniformly fill an optical path through which light propagates with $SiO_2$ glass (Japanese Patent Application Publication No. 2013-1721).

Solution to Problem

In order to solve the above problem, an optical module according to embodiments of the present invention is an optical module in which two components are optically connected, in which a glass layer is disposed in a region including an optical connection portion between the components, at least one of the components includes thin tubes through which outside air is introduced, and an end face of each of the thin tubes is in contact with the glass layer.

Advantageous Effects of Embodiments of Invention

According to embodiments of the present invention, an optical module having characteristics of excellent optical connection between components can be provided.

DETAILED DESCRIPTION OF ILLUSTRATIVE EMBODIMENTS

First Embodiment

A first embodiment of the present invention will be described below with reference to FIGS. 1 to 8.
<Configuration of Optical Module>

Figure 1:
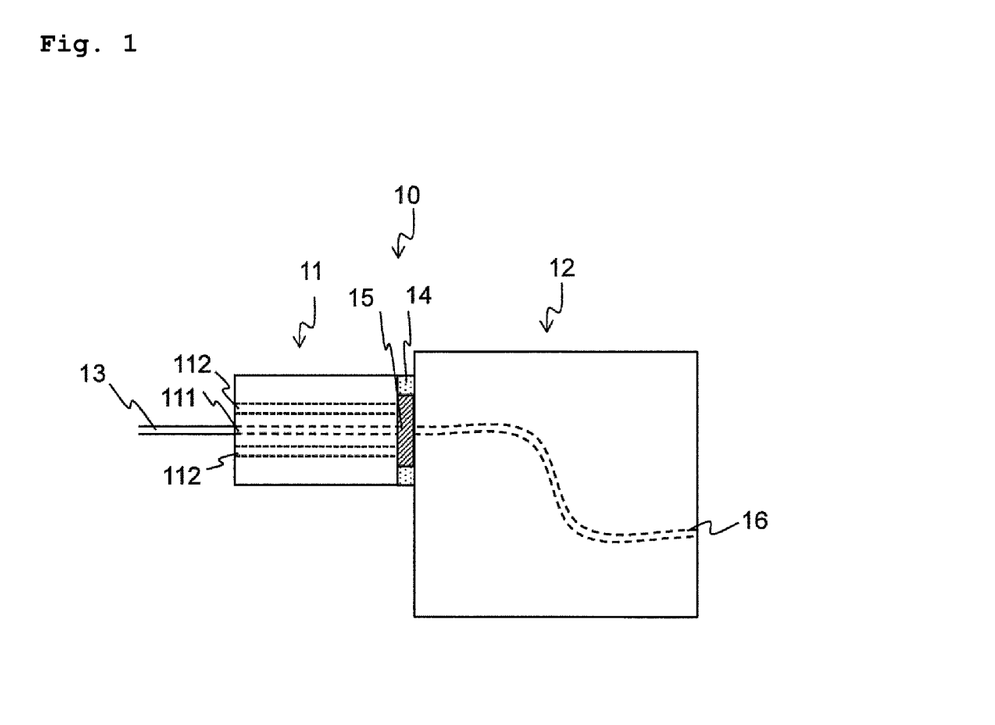
FIG. 1 is a top perspective view showing a configuration of an optical module according to a first embodiment of the present invention.

FIG. 1 is a top view of an optical module 10 according to the first embodiment of the present invention. The optical module 10 includes a fiber block 11, a PLC 12, and an optical fiber 13 and includes a UV curable resin adhesive layer 14 (hereinafter referred to as an "adhesive layer") and a glass layer 15 between the fiber block 11 and the PLC 12.

The optical fiber 13 is inserted into and fixed to the fiber block 11.

The light propagating through the optical fiber 13 is coupled to the optical waveguide 16 of the PLC 12 and propagates through the optical waveguide 16 of the PLC 12. Alternatively, the light propagating through the optical waveguide 16 of the PLC 12 is coupled to the optical fiber 13 and propagates through the optical fiber 13.

The adhesive layer 14 is a portion through which light to be input/output does not pass between connection end surfaces of the fiber block 11 and the PLC 12 and fixes at least a part of a region in which the glass layer 15 is not formed by adhesion.

The glass layer 15 fixes a region including a portion through which light to be input/output between the connection end surfaces of the fiber block 11 and the PLC 12 passes by adhesion. In other words, the glass layer 15 is disposed in a region including an optical connection portion between the fiber block 11 and the PLC 12.

Hereinafter, the "optical connection portion" refers to an optical path through which light propagates, including an incident/outgoing surface of light of a component of the optical module 10. For example, in the embodiment, the "optical connection portion" refers to an optical path through which light propagates and which includes an end face of the optical fiber 13 which is an incident/outgoing surface of light of the fiber block 11 and an end surface of the optical waveguide 16 which is an incident/outgoing surface of light of the PLC 12.

The fiber block 11 includes a V-groove 111 for fixing the optical fiber 13 and two thin tubes (V-grooves) 112 through which outside air is introduced. Details will be described below.

Figure 2:
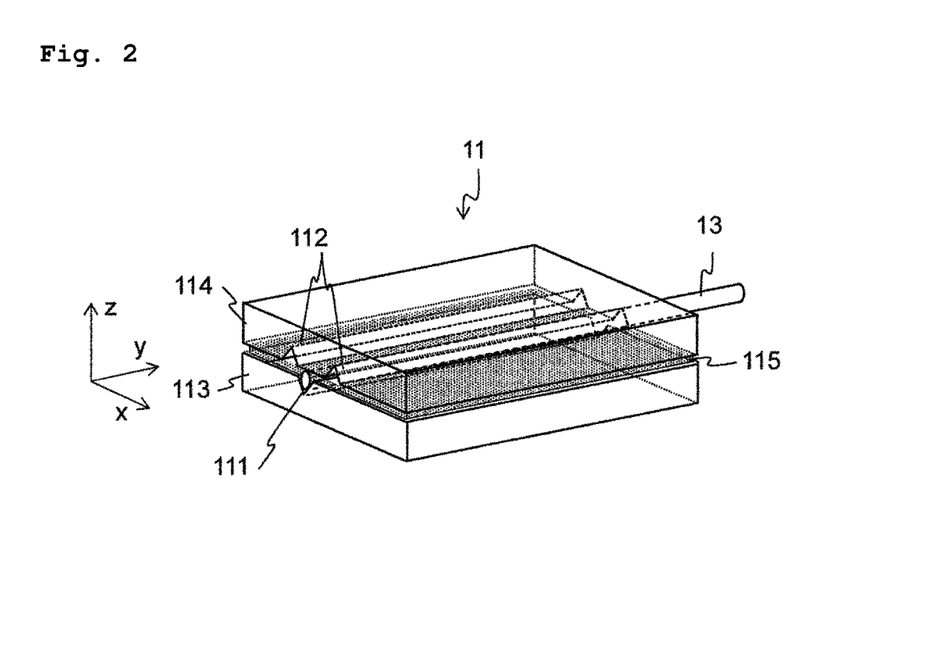
FIG. 2 is a bird's-eye view showing a configuration of a fiber block in the optical module according to the first embodiment of the present invention.

FIG. 2 shows a configuration of the fiber block 11. In the fiber block 11, the optical fiber 13 is disposed between two glass substrates 113 and 114 and fixed by an adhesive. The V-groove 111 for fixing the fiber is formed in one glass substrate 113 to fix the optical fiber 13. The optical fiber 13 is fitted into the V-groove 111 and fixed by an adhesive to assemble the fiber block 11. Here, the layer formed by the adhesive between the two glass substrates 113 and 114 is referred to as a "block fixing layer 115".

Furthermore, each of the thin tubes 112 is formed in a longitudinal direction (a Y direction in FIG. 2) of the optical fiber 13 when the fiber block 11 is assembled by forming a V-groove as a thin tube 112 through which the outside air is introduced on the other glass substrate 114.

Here, a cross section of each of the fiber fixing V-groove 111 and the thin tube V-groove 112 is an equilateral triangle having a side of about 100 μm. The cross sections of the V-grooves 111 and 112 do not have to be equilateral triangles and a length of one side does not have to be about 100 μm. An optical fiber diameter is about 130 μm.

Figure 3:
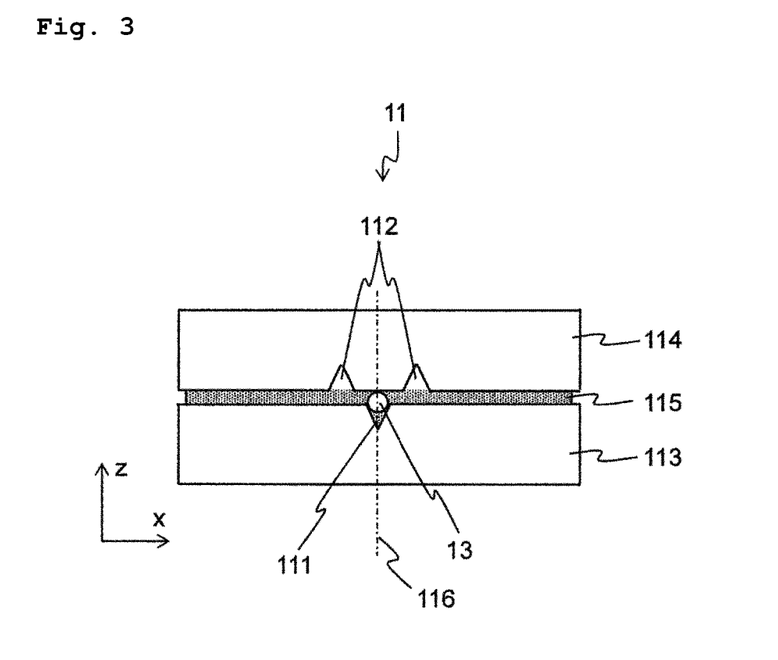
FIG. 3 is a cross-sectional view of an end of the fiber block in the optical module according to the first embodiment of the present invention.

FIG. 3 is a schematic view of the end surface of the fiber block 11. The two thin tubes (V-grooves) 112 described above are provided. Here, the number of thin tubes 112 may be one instead of two. A plurality of thin tubes 112 may be provided.

The end faces of the two thin tubes 112 are located at positions of line symmetry on the end surface of the fiber block 11 with an axis 116 in a vertical direction (z direction in the drawing) passing through a center of the optical fiber 13 as an axis of symmetry.

Hereinafter, the term "symmetry" includes not only perfect symmetry but also substantial symmetry. In the case of substantially symmetry, a difference from perfect symmetry may be within a range in which a force is uniformly applied to the fiber blocks 11 and the PLC 12 during curing and shrinkage in the process of forming the glass layer 15, as described later. Specifically, there may be a difference of about 500 μm from a position of complete symmetry.

In the case of a single thin tube, it is preferable to dispose the thin tube near the axis 116 in the vertical direction (Z direction in the drawings) passing through the center of the optical fiber 13. Here, as will be described later, one thin tube may be disposed within a range in which a force is uniformly applied to the fiber block 11 and the PLC 12 during curing and shrinkage in the process of forming the glass layer 15. Specifically, the range may be about 500 μm from the axis 116 in a direction perpendicular to the axis 116.

By providing the thin tube 112, when the fiber block 11 and the PLC 12 are connected, outside air can be introduced through the thin tube 112 into a connection portion between the fiber block 11 and the PLC 12, particularly a region in which the glass layer 15 is disposed.

Although the thin tube 112 which passes through the fiber block 11 is provided by forming a V-groove in the glass substrate 114 which constitutes the fiber block 11 in the embodiment, it is also possible to provide the thin tube 112 in the fiber block 11 by forming a through hole by machining.

The adhesive layer 14 is provided not to come into contact with an optical path through which light propagates, that is, an optical connection portion, to avoid deterioration due to light to be input/output between the optical fiber 13 and the PLC 12. In the embodiment, it is possible to prevent the UV curable resin adhesive from flowing into the optical path and coming into contact with the optical path by controlling the filling amount of the adhesive by keeping the distance between the optical fiber 13 and the PLC 12 of the optical connection portion constant.

Alternatively, as disclosed in PTL 2, it is possible to prevent the UV curable resin adhesive from flowing into (entering) the optical path and coming into contact with the optical path by providing a groove in the end surface of the fiber block 11.

In this way, the deterioration of the UV curable resin adhesive of the adhesive layer due to visible light is prevented.

The glass layer 15 is provided so that a cross section of the glass layer 15 covers a cross section of an optical path, that is, a cross section of an optical connection portion at a connection portion between the optical fiber 13 and the optical waveguide 16 of the PLC 12, and the optical fiber 13 and the optical waveguide 16 of the PLC 12 are optically connected through the glass layer 15. Therefore, the dust collection effect can be prevented, and increase of the optical loss over time at the optical connection portion can be prevented.

The glass layer 15 is formed by using polysilazane as a precursor material.

The polysilazane is an inorganic polymer material having SiH2NH as a basic unit and is cured by reacting with water to form a high-purity silica film. The cured silica film is colorless and transparent, does not have an absorption edge for visible light, and has high transparency.

Furthermore, since the polysilazane becomes inorganic $SiO_2$ after curing, it is resistant to light having high energy and further has heat resistance to about 1000° C.

Furthermore, since polysilazane is a one-liquid type solution, a minute gap at a connection point can be easily filled with polysilazane.

As described above, in the embodiment, by using the thin tube 112 through which outside air is introduced, outside air is brought into contact with the glass precursor (polysilazane) which reacts with water and is cured to form the glass layer 15 which is cured. Therefore, the outside air is a gas made to contain moisture.

In the embodiment, polysilazane is used as the glass precursor, but precursors containing silicon alcoholic $Si(OC_2H_5)_4$ as a main component, hydrogen silicate $(H_2SiF_6)$ as a main component, and the like can be used.

<Method of Manufacturing Optical Module>

An example of a method of manufacturing the optical module 10 according to the embodiment will be described below.

First, the production of PLC 12 will be described. First, an underclad layer made of quartz glass having a thickness of 20 μm and a core layer made of quartz glass having a thickness of 2 μm whose refractive index is increased by Ge-doping are sequentially deposited on a Si substrate.

Subsequently, the core layer is formed into a pattern of the optical waveguide 16 by the usual exposure development techniques and etching techniques. Here, the width of the optical waveguide 16 is about 2 μm.

Subsequently, after 20 μm of an overclad layer made of quartz glass is deposited to form an optical waveguide 16, the wafer is cut and a chip having a width of 5 mm and a length of 10 mm is cut out.

Finally, in order to increase the bonding area with the fiber block 11, a $SiO_2$ substrate (fitting plate) having a width of 5 mm, a length of 2 mm, and a thickness of 1 mm is adhered to the surface of the end side of the PLC 12 to be adhered to the fiber block 11 with a UV curable resin adhesive.

The PLC 12 is prepared in this way.

The preparation of the fiber block 11 will be described below. First, two $SiO_2$ substrates 113 and 114 having a thickness of 1 mm and an area of 5 mm×5 mm are prepared.

Subsequently, the V-groove 111 for fixing the optical fiber 13 having a diameter of 125 μm is formed on a surface of one $SiO_2$ substrate 113 by machining and the optical fiber 13 is fitted into the V-groove 111.

Subsequently, two V-grooves 112 through which outside air is introduced are formed on a surface of the other $SiO_2$ substrate 114 by machining.

Subsequently, the surface of one $SiO_2$ substrate 113 and the surface of the other $SiO_2$ substrate 114 are made to face each other and the optical fiber 13 is disposed between the surfaces of the two $SiO_2$ substrates 113 and 114, and the two $SiO_2$ substrates 113 and 114 and the optical fiber 13 are bonded and fixed by a UV curalbe resin adhesive.

Finally, the end surface of the fiber block 11 is polished.

In this way, the two V-grooves 112 through which the outside air is introduced are formed so that the end faces of the two V-grooves 112 are positioned line-symmetrically with an axis in a vertical direction passing through the center of the optical fiber 13 as a symmetrical axis on the end surface of the fiber block 11 when the surfaces of the two $SiO_2$ substrates 113 and 114 are faced to each other and bonded to each other.

Here, it is necessary to adjust a coating amount of the adhesive and the pressing pressure during bonding so that the V-groove 112 through which the outside air is introduced is not filled with the UV curable resin adhesive when the $SiO_2$ substrates 113 and 114 are bonded.

Finally, the preparation of the optical module 10 having the fiber block 11 and the PLC 12 will be described.

First, after the connection position is adjusted in a state in which the fiber block 11 and the PLC 12 are fixed to the fine adjustment aligning device and the end surfaces of the fiber block 11 and the PLC 12 are separated by about 1 μm, the fiber block 11 and the PLC 12 are bonded and fixed (firmly fixed) using a UV curable resin adhesive.

Finally, after the fixed (firmly fixed) fiber blocks 11 and PLC 12 are removed from the fine adjustment aligning device, the gaps in the light passing portion between the connection end surfaces are filled with polysilazane which is a glass precursor. After that, polysilazane is cured by introducing water vapor into the thin tube (V-groove) 112 for about several hours using a water vapor generator to form the glass layer 15 in the light passing portion.

Polysilazane may be cured by leaving it at room temperature for several days to form the glass layer 15 at the light passing portion.

As described above, the optical module 10 according to the embodiment is prepared.

<Effect of Optical Module>

Effects of the optical module 10 according to the embodiment will be described below.

Figure 4:
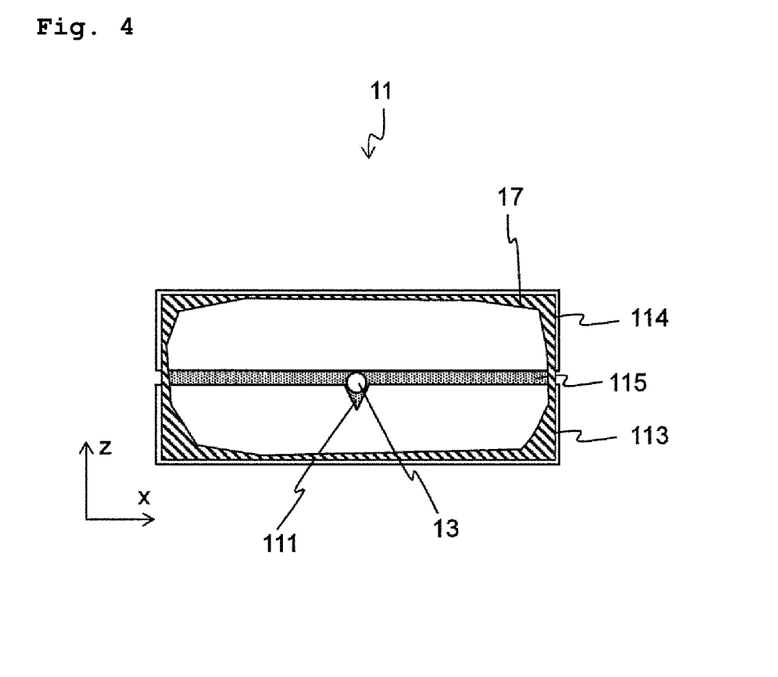
FIG. 4 is a schematic diagram for explaining an effect of the optical module according to the first embodiment of the present invention.

In the process of preparing the optical module in the related art, as shown in FIG. 4, only the peripheral portion of the end surface of the fiber block 11 is in contact with the outside air so that the polysilazane begins to cure from this peripheral portion. Here, FIG. 4 shows a cured region 17. Therefore, voids are likely to occur in the central portion of the end surface of the fiber block 11. This is because uncured polysilazane shrinks toward the portion in which curing progresses rapidly.

As a result, the optical connection portion between the optical fiber 13 at the central portion of the end surface of the fiber block 11 and the optical waveguide 16 of the PLC 12 is filled with $SiO_2$ in a state in which voids are generated so that a uniform glass layer 15 is not formed.

Figure 5:
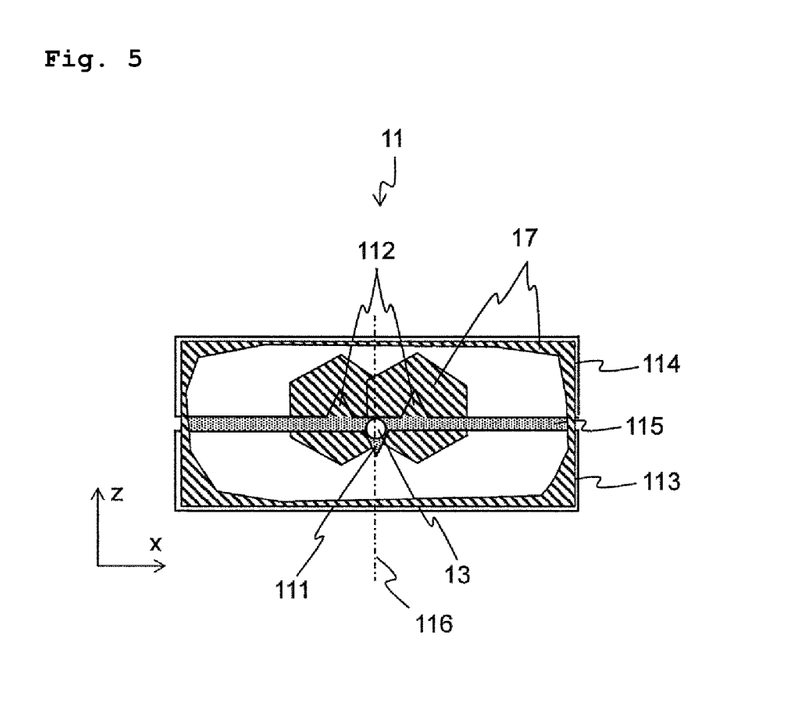
FIG. 5 is a schematic diagram for explaining an effect of the optical module according to the first embodiment of the present invention.

On the other hand, the fiber block 11 includes the thin tube 112 through which outside air is introduced in the vicinity of the optical connection portion between the optical fiber 13 and the PLC 12 in the optical module 10 according to the embodiment, as shown in FIG. 5. As a result, curing starts not only from the peripheral portion of the end surface of the fiber block 11 but also from the periphery of the thin tube 112. Here, FIG. 5 shows a cured region 17. Therefore, the occurrence of voids in the central portion of the end surface of the fiber block 11 can be prevented.

As a result, since the occurrence of voids is prevented at the optical connection portion between the optical fiber 13 and the PLC 12 at the central portion of the end surface of the fiber block 11 and the optical connection portion is filled with $SiO_2$, a uniform glass layer 15 is formed.

Here, the position of the thin tube 112 through which outside air is introduced depends on a size and a shape of the fiber block 11. In the shape of the fiber block 11 used in the optical module 10 according to the embodiment, it is effective to dispose the thin tube 112 through which the outside air is introduced within a range of 50 μm to 600 μm from the optical connection portion between the optical fiber 13 and the PLC 12.

In the embodiment, the end faces of the two thin tubes 112 through which outside air is introduced are disposed at line symmetrical positions with the axis 116 in the vertical direction (z direction in the drawing) passing through the center of the optical fiber 13 as a symmetry axis on the end surface of the fiber block 11 so that $SiO_2$ formed by curing shrinkage becomes symmetrical with respect to the optical connection portion and the uniform force is applied to the fiber block 11 and the PLC 12 in the process of the polysilazane. As a result, the deviation (optical axis deviation) between the optical axis of the fiber block 11 and the optical axis of the PLC 12 is prevented.

The connection loss of the optical module 10 according to the embodiment will be described. The connection loss of the optical module 10 is evaluated by a high power resistant measuring system shown in FIG. 6.

Figure 6:
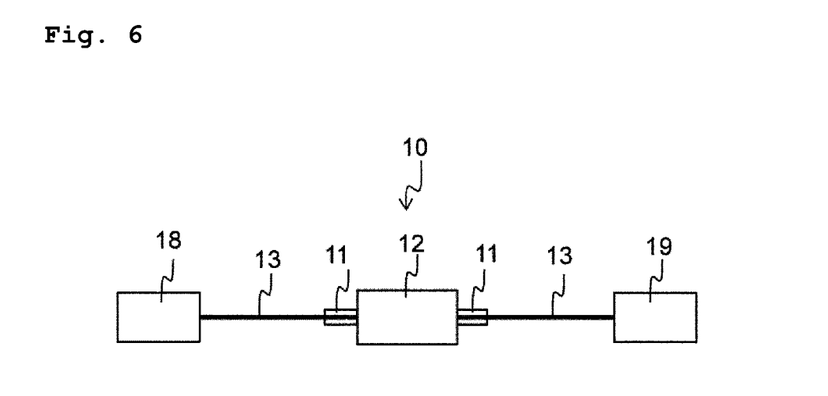
FIG. 6 is a diagram showing a measurement system for evaluating an effect of the optical module according to the first embodiment of the present invention.

The optical module 10 includes the fiber block 11, the PLC 12, and the optical fiber 13 on an input side and an output side.

Light having a wavelength of 405 nm propagates and is incident from the laser 18 to and on the fiber block 11 on the input side of the optical module 10 through the optical fiber 13, propagates through the PLC 12, and is emitted from the fiber block 11 on the output side of the optical module 10. The output power of the emitted light is measured by a power meter 19.

3.0 dB is measured as the total insertion loss of the optical module 10. Since the transmission loss of the PLC 12 is estimated to be 1.0 dB from the existing measurement, the connection loss between the fiber block 11 on the input side and the output side and the PLC 12 is estimated to be 1.0 dB, respectively.

For comparison, in the measurement system shown in FIG. 6, measurement is performed using an optical module in the related art instead of the optical module according to the embodiment. In the optical module in the related art, the light passing portion is an air gap. As a result, the connection loss is 1.0 dB which is the same value as when the optical module according to the embodiment is used.

Therefore, in the optical module 10 according to the embodiment, there is no problem in light transmittance and connection with low loss is confirmed.

Figure 7:
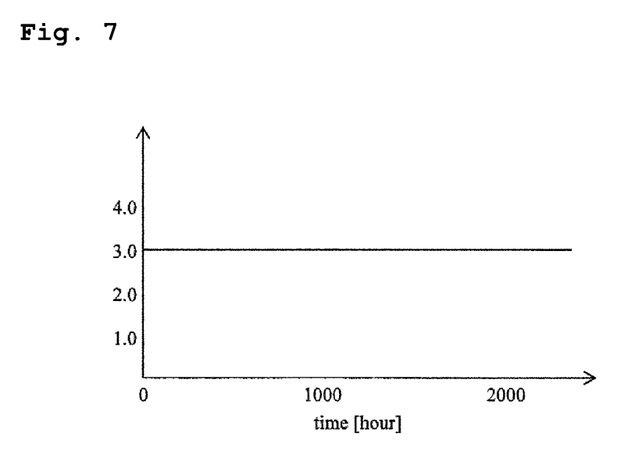
FIG. 7 is a diagram showing an evaluation result of an effect of the optical module according to the first embodiment of the present invention.

In addition, the loss fluctuation (change with time) of the optical module 10 according to the embodiment is measured. The loss of the optical module 10 is measured for 2000 hours by injecting light having a wavelength of 405 nm and 20 mW. As a result, as shown in FIG. 7, it was found that in the optical module 10 according to the embodiment, the insertion loss does not change from 3 dB even after 2000 hours have elapsed.

For comparison, the same measurement is performed using an optical module in the related art instead of the optical module according to the embodiment. As a result, in the optical module in the related art, the loss increases in about 100 hours. As described above, it has been confirmed by analysis that the dust collecting effect collects dust in the air gap, which increases the connection loss.

As described above, it is found that the optical module 10 according to the embodiment is excellent in reliability.

From the above, according to the optical module 10 according to the embodiment, it is possible to make an optical connection resistant to high-energy light in the visible region.

Although an example in which the fiber block 11 is composed of two glass plates is shown in the optical module 10 according to the embodiment, the present invention is not limited to this and the fiber block 11 may be composed of a plurality of glass plates.

<Modified Examples>

Furthermore, in an optical module according to the modified example of the embodiment, a substrate (capillary substrate) having a plurality of thin tubes (capillaries) is used instead of the fiber block in the first embodiment. The other components are the same as in the first embodiment.

Figure 8:
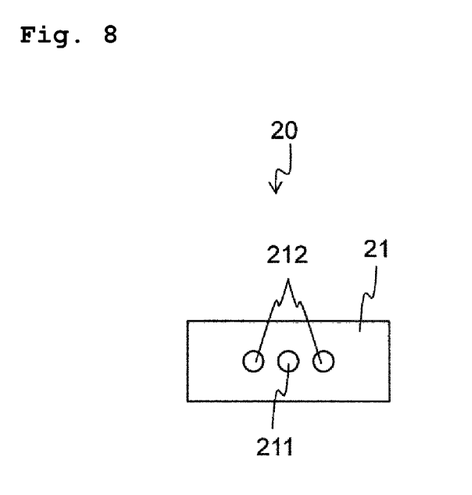
FIG. 8 is a cross-sectional view of an end of a substrate in an optical module according to a modified example of the first embodiment of the present invention.

In the optical module 20 according to the modified example, as shown in FIG. 8, the substrate 21 having a plurality of thin tubes (capillaries) is used and the optical fiber 13 is inserted into one thin tube 211, and other thin tubes 212, for example, thin tubes located on both sides of the thin tube into which the optical fiber 13 is inserted can be used as the thin tube through which outside air is introduced.

According to the optical module 20 according to the modified example, when the thin tube 212 through which outside air is introduced is provided near the optical connection portion, curing starts not only from the peripheral portion of the end surface of the substrate 21 but also from the periphery of the thin tube 212 so that the occurrence of voids in the optical connection portion can be prevented. As a result, the optical connection portion between the optical fiber and the PLC is filled with $SiO_2$ so that a uniform glass layer is formed.

Furthermore, according to the optical module 20 according to the modified example, the fiber and the PLC can be bonded (fixed) with a smaller bonding area than the fiber block.

Second Embodiment

An optical module according to a second embodiment of the present invention will be described below with reference to FIGS. 9 and 10. In an optical module 30 according to the embodiment, two PLCs are optically connected by polysilazane.

<Configuration of Optical Module>

Figure 9:
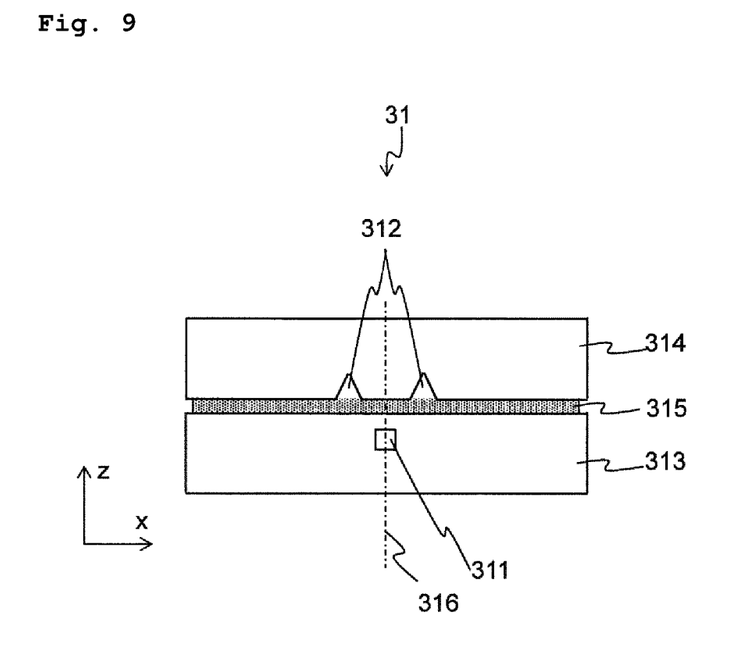
FIG. 9 is a cross-sectional view of an end of a PLC in an optical module according to a second embodiment of the present invention.
Figure 10:
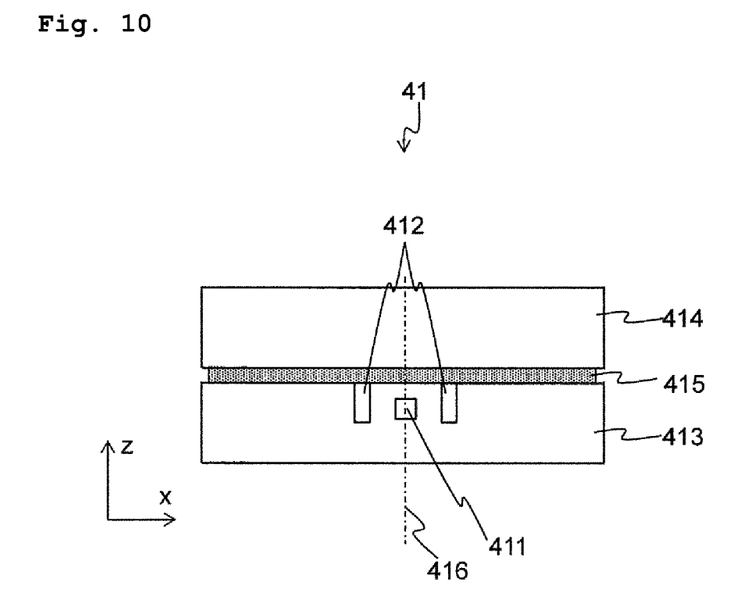
FIG. 10 is a cross-sectional view of an end of a PLC in an optical module according to the second embodiment of the present invention.

FIG. 9 shows the periphery of the end surface of one PLC at a connection point of the two PLCs in the optical module 30 according to the embodiment. The same applies to the periphery of the end surface of the other PLC.

The optical module 30 according to the embodiment includes two PLC components 31 and 32 (not shown). The PLC component 31 includes a PLC 313 and a fitting plate 314 and the PLC 313 and the fitting plate 314 are fixed by an adhesive. Here, the fitting plate 314 is fixed to a surface on an end side of a PLC 12 on a side to be bonded to another component (the other PLC component 32 in the embodiment). Hereinafter, a layer formed of an adhesive between the PLC 313 and the fitting plate 314 is referred to as a "PLC fixing layer 315". The PLC component 32 has the same configuration as the PLC component 31.

The PLC 313 has an optical waveguide 311.

Two thin tubes (V-grooves) 312 through which outside air is introduced are formed on the fitting plate 314 so that the end faces thereof are in line symmetry positions with an axis 316 in the vertical direction (z direction in the drawing) passing through a center of the optical waveguide 311 of the PLC 313 as an axis of symmetry on the end surface of the PLC component 31.

A shape, a configuration, and a PLC configuration of the thin tube (V-groove) 312 formed in the fitting plate 314 are the same as those in the first embodiment.

A glass layer and an adhesive layer are formed between the two PLC components 31 and 32 in the same manner as in the first embodiment and the optical module 30 is prepared by bonding and fixing these two PLC components 31 and 32.

As a result, a glass layer is formed in a region including an optical connection portion between the PLC components 31 and 32, and the PLC components 31 and 32 are fixed. Specifically, a glass layer is formed in a region including an optical path through which light propagates, including an end surface of an optical waveguide which is an incident/outgoing surface of each of the PLC components 31 and 32.

Here, a cross section of the glass layer is formed to cover a cross section of the optical connection portion.

Furthermore, an adhesive layer is formed in at least a part of a region between the PLC components 31 and 32 in which the glass layer is not formed and the PLC components 31 and 32 are fixed.

<Effect of Optical Module>

As in the first embodiment, the optical module 30 according to the embodiment can prevent the occurrence of voids in the optical connection portion in the process of forming the glass layer and the optical connection portion between the PLC components 31 and 32 is filled with $SiO_2$ so that a uniform glass layer is formed.

The insertion loss of the optical module 30 according to the embodiment will be described. The measuring system is substantially the same as the embodiment and the optical module according to the embodiment having a configuration in which two PLCs are connected is used instead of the optical module according to the first embodiment having the fiber blocks at the incident end and the outgoing end of the PLC.

As a result of the measurement, the connection loss at the optical connection portions of the two PLCs is 1.0 dB which is equivalent to that of the optical module according to the first embodiment.

In addition, the insertion loss does not change even if light having a wavelength of 405 nm and 1 mW is transmitted through the optical module 30 for 2000 hours with regard to the high power resistance of the optical connection portion. As described above, the optical module 30 according to the embodiment has a high power resistance equivalent to that of the optical module according to the first embodiment.

According to the optical module 30 according to the embodiment, the two PLCs can be directly bonded and fixed without using a fiber. Further, the optical module has resistance to high-power light at the optical connection portions of the two PLCs.

According to the optical module 30 according to the embodiment, it is possible to realize a small module in which axial misalignment is prevented even in a high temperature environment.

In addition, according to the optical module 30 according to the embodiment, the number of optical connection portions is reduced to half as compared with the configuration in which PLCs are connected to each other via fibers so that improvement in yield and reduction in cost can be realized.

Although an example in which the thin tube 312 through which outside air is introduced is provided by forming a V-groove in the fitting plate 314 is shown in the optical module 30 according to the embodiment, the present invention is not limited to this. As shown in FIG. 10, the thin tube 412 can be provided by forming a deep groove 412 in the PLC 413. Here, a width of the deep groove 412 is about 100 μm and a depth is about 40 μm and 100 μm.

In the preparation of the PLC having this configuration, when there is a process of forming a groove by dry etching or the like, a deep groove through which outside air is introduced can be formed at the same time and a load in the preparation process can be reduced.

Although an example in which PLCs are optically connected to each other is shown in the optical module 30 according to the embodiment, one may be a PLC component in the embodiment and the other may be a normal fiber block (fiber block which does not have a thin tube through which outside air is introduced).

Although an example in which a thin tube through which outside air is introduced is formed in both of the two PLC components is shown in the optical module 30 according to the embodiment, the present invention is not limited to this. A thin tube through which outside air is introduced may be formed only in one PLC component.

The "vertical direction" in the embodiment of the present invention refers to a direction perpendicular to a bottom surface of the optical module component, for example, a fiber block or a PLC component.

Although an example in which the optical module includes a fiber block having a thin tube through which outside air is introduced and a PLC component which does not have a thin tube through which outside air is introduced is shown in the embodiment of the present invention, both of the fiber block and the PLC component may have a thin tube through which outside air is introduced.

An example in which an optical module component, for example, a fiber block or a PLC component, is provided with a thin tube through which outside air is introduced in the vicinity of an optical connection portion is shown in the embodiment of the present invention. Here, as a result of the thin tube being disposed in the vicinity of the optical connection portion, the end face of the thin tube comes into contact with the glass layer (glass precursor) of the optical connection portion. Here, the "vicinity of the optical connection portion" is in the range of about 50 μm and 600 μm from the optical connection portion.

Although an example in which two thin tubes are provided to introduce outside air is shown in the embodiment of the present invention, the present invention is not limited to this. One thin tube may be provided. Furthermore, of course, a plurality of thin tubes of three or more may be provided. Any structure may be used as long as outside air can be introduced through it in the process of forming the glass layer Although an example in which two thin tubes are disposed in parallel with an optical fiber or an optical waveguide of a PLC to introduce outside air is shown in the embodiment of the present invention, the present invention is not limited to this. The thin tube does not have to be disposed parallel to the optical fiber or the optical waveguide of the PLC and may be bent. If one end face of the thin tube is located in the vicinity of the glass layer, the other end face may be located on a surface in contact with the outside air such as the surface or side surface of the fiber block.

Although an example in which the end faces of the two thin tubes are located at the end surfaces of the fiber block at a position of line symmetry with the vertical axis passing through the center of the optical fiber as the axis of symmetry to introduce outside air is shown in the embodiment of the present invention, the present invention is not limited to this. The thin tubes may not be disposed symmetrically. Any structure may be used as long as outside air can be introduced through it in the process of forming the glass layer.

Although an example in which the thin tube through which outside air is introduced is a V-groove having a triangular cross section is shown in the embodiment of the present invention, the present invention is not limited to this. The cross-sectional shape of the thin tube may be another shape such as a circle, an ellipse, a semicircle, a rectangle, or a polygon.

Although an example in which fixing is performed between the components of an optical module, for example, between a fiber block and a PLC component or between PLC components using a glass layer and an adhesive layer is shown in the embodiment of the present invention, the present invention is not limited to this. It is not necessary to provide the adhesive layer, when the components of the optical module can be fixed only by the glass layer without causing an optical axis deviation, for example, when forming a glass layer having a sufficiently large area for fixing.

Although an example in which a glass layer is formed using polysilazane is shown in the embodiment of the present invention, the present invention is not limited to this and the glass layer may be formed by another liquid phase synthesis method. The liquid phase synthesis method may be, for example, a sol-gel method. In the sol-gel method, a liquid raw material is hydrolyzed and polymerized to form a gel state, which is left at room temperature or fired to be cured to form a glass layer. Furthermore, a liquid phase precipitation method may be used. In the liquid phase precipitation method, a liquid raw material is hydrolyzed and cured to form a glass layer.

Although an example in which the outside air introduced through a thin tube is a gas containing water to form a glass layer by reacting with water is shown in the embodiment of the present invention, the present invention is not limited to this. For example, when the glass layer is formed by drying, a dried gas, for example, nitrogen, may be used as the outside air. For example, when the glass layer is formed by oxidation, a gas containing oxygen may be used as the outside air.

Although an example in which the optical module is composed of two components is shown in the embodiment of the present invention, the present invention is not limited to this and the optical module may be composed of a plurality of components. In the case of being composed of a plurality of components, a structure in which a glass layer and a thin tube shown in the embodiment of the present invention are provided may be provided between at least one component.

Although an example of the structure, the dimensions, the materials, and the like of each component in the configuration, the manufacturing method, and the like of the optical module is shown in the embodiment of the present invention, the present invention is not limited to this. Any optical module may be used as long as it can exhibit the function of the optical module and exhibit the effect thereof.

INDUSTRIAL APPLICABILITY

The present invention can be applied to equipment and devices of an optical communication/optical signal processing systems and an optical information transmission systems.

REFERENCE SIGNS LIST

10 Optical module
11 Fiber block
111 V-groove for optical fiber
112 Thin tube
12 PLC
13 Optical fiber
14 Adhesive layer
15 Glass layer
16 Optical waveguide.

The invention claimed is:

1. An optical module comprising:
   two components optically connected to each other;
   a glass layer disposed in a region including an optical connection portion that is an optical path through which light propagates between the two components; and
   a tube configured to introduce outside air formed in at least a first component of the two components, wherein an end face of the tube is in contact with the glass layer, wherein the first component further comprises an optical fiber, and wherein an end face of the optical fiber of the first component is positioned on the same level as the end face of the tube at one side of the glass layer.

2. The optical module according to claim 1, wherein the optical connection portion passes through the glass layer.

3. The optical module according to claim 1, wherein the first component is provided with a plurality of tubes configured to introduce outside air, wherein when viewed from a second component of the two components, end faces of the plurality of tubes are disposed at positions linearly symmetric with respect to an axis passing through a center of the optical connection portion and orthogonal to a propagation direction of light in the optical connection portion as a symmetry axis.

4. The optical module according to claim 1, wherein the first component is provided with a single tube configured to introduce outside air, wherein when viewed from a second component of the two components, the end face of the tube is disposed in a vicinity of an axis passing through a center of the optical connection portion and orthogonal to a propagation direction of light in the optical connection portion.

5. The optical module according to claim 1, further comprising an adhesive layer made of an adhesive between the two components, wherein the adhesive layer does not come into contact with the optical connection portion.

6. The optical module according to claim 1, wherein:
the first component is a fiber block including:
- a plurality of substrates; and
- an optical fiber provided between the plurality of substrates; and the optical connection portion includes an end face of the optical fiber.

7. The optical module according to claim 1, wherein:
the first component includes a substrate having:
- a plurality of capillaries; and
- an optical fiber disposed in at least one of the plurality of capillaries;

the optical connection portion includes an end face of the optical fiber; and
the tube is another one of the plurality of capillaries.

8. The optical module according to claim 1, wherein:
the first component is a PLC component;
the PLC component includes a PLC having an optical waveguide and a fitting plate;
the optical connection portion includes an end face of the optical waveguide; and
the tube is provided in at least one of the PLC or the fitting plate.

9. An optical module comprising:
a first component;
a second component optically connected to the first component by an optical connection portion, the optical connection portion being an optical path through which light propagates between the first component and the second component;
a glass layer, wherein the optical connection portion passes through the glass layer; and
a tube configured to introduce outside air and disposed in the first component, wherein an end face of the tube is in contact with the glass layer, wherein the first component further comprises an optical fiber, and wherein an end face of the optical fiber of the first component is positioned on the same level as the end face of the tube at one side of the glass layer.

10. The optical module according to claim 9, wherein the first component comprises a plurality of tubes configured to introduce outside air, wherein when viewed from the second component, end faces of the plurality of tubes are disposed at positions linearly symmetric with respect to an axis passing through a center of the optical connection portion and orthogonal to a propagation direction of light in the optical connection portion as a symmetry axis.

11. The optical module according to claim 9, wherein the first component comprises a single tube configured to introduce outside air, wherein when viewed from the second component, the end face of the tube is disposed within 50 μm and 600 μm of an axis passing through a center of the optical connection portion and orthogonal to a propagation direction of light in the optical connection portion.

12. The optical module according to claim 9, further comprising an adhesive layer between the first component and the second component, wherein the adhesive layer does not come into contact with the optical connection portion.

13. The optical module according to claim 9, wherein:
the first component is a fiber block including:
- a plurality of substrates; and
- an optical fiber between the plurality of substrates; and the optical connection portion includes an end face of the optical fiber.

14. The optical module according to claim 9, wherein:
the first component includes a substrate having:
- a plurality of capillaries; and
- an optical fiber disposed in at least one of the plurality of capillaries;

the optical connection portion includes an end face of the optical fiber; and
the tube is another one of the plurality of capillaries.

15. The optical module according to claim 9, wherein:
the first component is a PLC component;
the PLC component includes a PLC having an optical waveguide and a fitting plate;
the optical connection portion includes an end face of the optical waveguide; and
the tube is provided in at least one of the PLC or the fitting plate.

16. The optical module according to claim 1, wherein a second component of the two components comprises an optical fiber, and wherein an end face of the optical fiber of the second component is positioned on other surface of the glass layer facing the one side of the glass layer.

17. The optical module according to claim 9, wherein the second component comprises an optical fiber, and wherein an end face of the optical fiber of the second component is positioned on another surface of the glass layer facing the one side of the glass layer.

* * * * *